United States Patent [19]

Gitzel et al.

[11] Patent Number: 5,187,038
[45] Date of Patent: Feb. 16, 1993

[54] POLYMERIC AMMONIUM COMPOUNDS AS CHARGE CONTROL AGENTS

[75] Inventors: Jörg Gitzel, Waldems; Detlef Wehle, Niedernhausen; Hans-Tobias Macholdt, Darmstadt, all of Fed. Rep. of Germany

[73] Assignee: Hoechst Aktiengesellschaft, Frankfurt am Main, Fed. Rep. of Germany

[21] Appl. No.: 761,412

[22] Filed: Sep. 17, 1991

[30] Foreign Application Priority Data

Sep. 19, 1990 [DE] Fed. Rep. of Germany ....... 4029653
Feb. 7, 1991 [DE] Fed. Rep. of Germany ....... 4103610

[51] Int. Cl.$^5$ ............................................. G03G 9/097
[52] U.S. Cl. .................................... 430/110; 524/904; 525/217; 525/293; 525/540; 525/934
[58] Field of Search ................. 430/110; 524/904; 525/934

[56] References Cited

U.S. PATENT DOCUMENTS

| | | | |
|---|---|---|---|
| 4,057,426 | 11/1977 | Mammino et al. | 430/106 |
| 4,299,898 | 11/1981 | Williams et al. | 430/110 X |
| 4,397,934 | 8/1983 | Lu | 430/110 |
| 4,415,646 | 11/1983 | Gruber et al. | 430/110 |
| 4,496,643 | 1/1985 | Wilson et al. | 430/110 |
| 4,621,039 | 11/1986 | Ciccarelli et al. | 430/110 X |
| 4,656,112 | 4/1987 | Kawagishi et al. | 430/110 |
| 4,683,188 | 7/1987 | Suzuki et al. | 430/110 |
| 4,684,596 | 8/1987 | Bonser et al. | 430/110 |
| 4,840,863 | 6/1989 | Otsu et al. | 430/110 |

FOREIGN PATENT DOCUMENTS 200160 8/1988 Japan .................................... 430/110

*Primary Examiner*—Roland Martin

[57] ABSTRACT

Use of polymeric ammonium salts which have a molecular weight of about 5000 to about 500,000, and are obtained by homopolymerization of monomers, such as, for example, diallyldialkylammonium chloride, or by copolymerization of mixtures of two monomers, such as, for example, diethyldimethylammonium chloride and diallylmethyloctylammonium chloride, with molar monomer ratios of about 0.5:0.5 to about 0.95:0.05 in the copolymer, and if appropriate subsequent anion exchange, individually or in combination as charge control agents in electrophotographic toners and developers which are employed for copying or duplicating masters and for printing electronically, magnetically or optically stored information or in colorproofing, and as charge control agents in powders and powder coatings.

18 Claims, No Drawings

POLYMERIC AMMONIUM COMPOUNDS AS CHARGE CONTROL AGENTS

The present invention relates to the use of polymeric ammonium compounds based on homo- or copolymeric poly-(diallylammonium) derivatives and copolymers of poly(di-allylammonium) derivatives with selected vinyl compounds as charge control agents in toners and developers for electrophotographic recording processes and in powders and powder coatings for surface coating. As a result of specific combination of certain polymeric ammonium cations with selected anions, the compounds according to the invention have particularly high and constant charge control properties and very good heat stabilities and dispersibilities.

In electrophotographic recording processes, a "latent charge image" is generated on a photoconductor. This is effected, for example, by charging of a photoconductor by a corona discharge and subsequent imagewise exposure of the electrostatically charged surface of the photoconductor to light, the exposure to light causing the charge to drain to the earthed substrate at the exposed points. The "latent charge image" thus generated is then developed by application of a toner. In a subsequent step, the toner is transferred from the photoconductor to, for example, paper, textiles, films or plastic and is fixed, for example by means of pressure, radiation, heat or the action of solvents. The photoconductor used is then cleaned and is available for a new recording operation.

The optimization of toners is described in numerous patent specifications, the influence of the toner binder (variation of resin/resin components or wax/wax components) and the influence of carriers (in two-component developers) and magnetic pigments (in one-component developers), inter alia, having been investigated.

The specific charge q/m (charge per unit weight) of a toner is a measure of its quality. In addition to the sign and level of the electrostatic charge, rapid attainment of the desired charge level and constancy of this charge over a prolonged activation period are decisive quality criteria. In practice, this is of central importance inasmuch as the toner may be exposed to a considerable activation time in the developer mixture before it is transferred to the photoconductor, since it sometimes remains in the developer mixture for a period for production of up to several thousand copies. The insensitivity of the toner to climatic influences, such as temperature and atmospheric humidity, is moreover an important suitability criterion.

Both positively and negatively chargeable toners are used in copiers and laser printers, depending on the type of process and apparatus.

So-called charge control agents are often added in order to obtain electrophotographic toners or developers with either a positive or negative charge. As well as the sign of the charge control, the extent of the control effect is of importance here, since a higher activity allows a small amount to be employed. Since toner binders as a rule show a marked dependence of the charge on the activation time, the task of a charge control agent is on the one hand to adjust the sign and level of the toner charge and on the other hand to counteract the charge drift of the toner binder and ensure constancy of the toner charge.

Charge control agents which cannot prevent the toner or developer from displaying a high charge drift during a prolonged period of use (aging), which can even cause the toner or developer to undergo a charge reversal, are therefore unsuitable in practice.

Full color copiers and laser printers operate on the trichromatism principle which necessitates exact matching of the color shades of the three base colors (yellow, cyan and magenta). The smallest shift in color shade even of only one of the three base colors automatically requires a shift in the color shade of the other two colors so that full color copies and prints can still be produced true to the originals. Because of this precise matching of the coloristics of the individual coloring agents to one another which is required in color toners, charge control agents absolutely without an intrinsic color are especially important.

In color toners, the three toners of yellow, cyan and magenta must also be matched exactly to one another in respect of their triboelectric properties, as well as meeting the precisely defined color requirements. This triboelectric matching is necessary because the three color toners (or four color toners, if black is also included) must be transferred to the full color print or full color copy in succession in the same apparatus.

It is known that coloring agents can sometimes have an adverse influence on the triboelectric charge of toners (H.-T. Macholdt, A. Sieber, Dyes & Pigments 9 (1988), 119–27; and U.S. Pat. No. 4,057,426). different triboelectric effects of coloring agents and the resulting sometimes very pronounced influence on the toner chargeability, it is not possible for them simply to be added as a coloring agent once a toner base recipe has been compiled. Rather, it may be necessary for each coloring agent to have its own recipe compiled, for which, for example, the nature and amount of the charge control agent required is specifically tailor-made. This procedure is correspondingly expensive and also additionally raises the difficulties already described in the case of color toners for process color (trichromatism).

Highly effective colorless charge control agents which are capable of compensating the different triboelectric properties of various coloring agents and imparting the desired charge to the toner are therefore necessary. Coloring agents which differ greatly in their triboelectric properties can in this manner be employed in the various toners required (yellow, cyan, magenta and if appropriate black) with one and the same charge control agent with the said of a toner base recipe which has been formulated once. It is moreover important in practice that the charge control agents have a high heat stability and a good dispersibility. Typical temperatures for incorporating charge control agents into the toner resins are between 100° C. and 200° C. when, for example, kneaders or extruders are used. A heat stability of 200° C., or even better 250° C., is accordingly a great advantage. It is also important for the heat stability to be guaranteed over a prolonged period of time (about 30 minutes) and in various binder systems. This is important since matrix effects which occur again and again lead to premature decomposition of the charge control agent in the toner resin, which means that the toner resin becomes dark yellow or dark brown in color and all or some of the charge control effect is lost. Typical toner binders are polymerization, polyaddition and polycondensation resins, such as, for example, styrene, styrene-acrylate, styrene-butadiene, acrylate, polyester, phenolic and epoxy resins, individually or in combination, which can also contain other contents, such as coloring agents, waxes or flow auxiliaries, or can be given additions of these afterwards.

For a good dispersibility, it is of great advantage if the charge control agent as far as possible has no waxy properties, no tackiness and a melting or softening point of >150° C., preferably >200° C. Tackiness often leads to problems during metering into the toner formulation, and low melting or softening points can mean that no homogeneous distribution is achieved during dispersion, since the material combines, for example in the form of droplets, in the carrier material.

Apart from in electrophotographic toners and developers, charge control agents can also be employed for improving the electrostatic charge of powders and varnishes, in particular in triboelectrically or electrokinetically sprayed powder coatings such as are used for surface coating of objects of, for example, metal, wood, plastic, glass, ceramic, concrete, textile material, paper or rubber. Powder coating technology is used, inter alia, for varnishing small objects, such as garden furniture, camping articles, domestic appliances, vehicle components, refrigerators and shelves, and for varnishing workpieces of complicated shape. The powder coating or the powder is in general given its electrostatic charge by one of the following two processes:

a) in the corona process, the powder coating or the powder is led past a charged corona and charged during this operation, b) in the triboelectric or electrokinetic process, use is made of the principle of frictional electricity. The powder coating or the powder receives an electrostatic charge in the spray equipment, this being opposite to the charge of the friction partner, in general a hose or spray tube (for example of polytetrafluoroethylene).

A combination of the two processes is also possible.

Powder coating resins which are typically employed re epoxy resins, polyester resins containing carboxyl and hydroxyl groups and polyurethane and acrylic resins, together with the corresponding hardeners. Combinations of resins are also used. Thus, for example, epoxy resins are often employed in combination with polyester resins containing carboxyl and hydroxyl groups.

Examples of typical hardener components for epoxy resins are acid anhydrides, imidazoles and dicyandiamide and derivatives thereof. Example of typical hardener components for polyester resins containing hydroxyl groups are acid anhydrides, masked isocyanates, bisacylurethanes, phenolic resins and melamine resins, and examples of typical hardener components for polyester resins containing carboxyl groups are triglycidyl isocyanurates or epoxy resins. Oxazolines, isocyanates, triglycidyl isocyanurates or dicarboxylic acids, for example, can be used as typical hardener components in acrylic resins. The lack of an adequate charge can be observed, above all, in triboelectrically or electrokinetically sprayed powders and powder coatings which have been prepared on the basis of polyester resins, in particular polyesters containing carboxyl groups, or on the basis of so-called mixed powders, also called hybrid powders. Mixed powders are understood as being powder coatings, the resin basis of which consists of a combination of epoxy resin and polyester resin containing carboxyl groups. The mixed powders form the basis of the powder coatings represented most frequently in practice. Inadequate charging of the abovementioned powders and powder coatings means that the deposition rate and throwing power on the workpiece to be coated are inadequate. (The expression "throwing power" is a measure of the extent to which a powder or powder coating is deposited on the workpiece to be coated, including on reverse surfaces, hollow spaces, gaps and above all on inside edges and corners.)

Colorless charge control agents are claimed in numerous patents. Thus, for example, DE-A 3,144,017, JP-A2 61-236,557 and U.S. Pat. No. 4,656,112 describe metal complexes and metal organyls, DE-A 3,837,345, DE-A 3,738,948, DE-A 3,604,827, EP-A 242,420, EP-A 203,532, U.S. Pat. 4,684,596, U.S. Pat. No. 4,683,188 and U.S. Pat. No. 4,493,883 describe ammonium and immonium compounds and DE-A 3,912,396, U.S. Pat. No. 4,496,643 and U.S. Pat. No. 3,893,935 describe phosphonium compounds, and European Patent 185,509, JP-A2 01-136,166, JP-A2 63-060,458, JP-A2 62-264,066, U.S. Pat. No. 4,840,863, U.S. Pat. No. 4,639,043, U.S. Pat. No. 4,378,419, U.S. Pat. No. 4,355,167 and U.S. Pat. No. 4,299,898 describe polymeric ammonium compounds as colorless charge control agents.

Nevertheless, the colorless charge control agents known to date have a number of disadvantages which greatly limit, or sometimes render impossible, their use in practice. The chromium, iron, cobalt and zinc complexes described in DE-A 3,144,017 and U.S. Pat. No. 4,656,112 and the antimony organyls described in JP-A2 61-236,557 thus also have, as well as the problems of heavy metals, the disadvantage that in some cases they are not truly colorless, and can therefore find only a limited use in color toners or in white or colored powder coatings.

The known quaternary ammonium compounds which are suitable per se are often difficult to disperse, which leads to non-uniform charging of the toner. The problem moreover often occurs that the toner charge generated by these compounds is not stable over a prolonged activation period (up to an activation time of 24 hours), especially at high temperature and atmospheric humidity (EP-A 242,420), which then leads to accumulation of wrongly or not sufficiently charged toner particles in the course of a copying or printing process and therefore brings the process to a standstill. It is furthermore known that charge control agents on an ammonium and immonium basis can be sensitive to light or mechanical effects (EP-A 203,532 and U.S. Pat. No. 4,683,188) and unstable to heat, and that they form decomposition products which can have an adverse effect on the triboelectric charging of the toner (U.S. Pat. No. 4,684,596) and/or have a deep, often dark brown intrinsic color (DE-A 3,738,948, DE-A 3,604,827 and U.S. Pat. No. 4,493,883). They moreover often exhibit waxy properties, in some cases water solubility and/or a low activity as charge control agent.

Charge control agents which are based on highly fluorinated ammonium, immonium and phosphonium compounds and are suitable per se (DE-A 3,912,396 and DE-A 3,837,345) have the disadvantage of an expensive synthesis, which means that high preparation costs arise for the corresponding substances, and are not adequately stable to heat.

Phosphonium salts are less effective than ammonium salts as charge control agents (U.S. Pat. No., 4,496,643 and U.S. Pat. No. 3,893,939) and can present toxicology problems. Charge control agents based on polymeric ammonium compounds sometimes lead to an amine smell to the toner or developer and the charge control properties of these substances may be changed by relatively easy oxidation and uptake of moisture. The oxidation products are moreover colored and therefore cause trouble above all in color toners (U.S. Pat. No. 4,840,863). The abovementioned charge control agents for electrophotographic toners and developers are not suitable, for example because of their colored nature, for use in the predominantly white or clear triboelectrically or electrokinetically sprayed powders and powder coatings. A lack of heat stability moreover greatly limits the use of such charge control agents, since powder coatings are stoved, for example, at above 200° C. for 15 minutes. The charge control agents claimed in DE-A 3,837,345 and DE-A 3,600,395 for powders and powder coatings are difficult to handle because of their waxiness and water-solubility or hygroscopic nature and can be used only with limitations. The amines claimed in EP-A 0,371,528 as charge control agents for powders and powder coatings present problems for use in practice because of the odor nuisance.

The aim of the present invention was thus to discover improved, particularly active colorless charge control agents, with which, in addition to the charge level, rapid attainment and constancy of this charge must be ensured, and the charge control effect should not be sensitive to changes in temperature and atmospheric humidity. These compounds should moreover be heat stable to a high degree, above all also over a prolonged period of time in the particular carrier material (resin), and as far as possible water-insoluble, readily dispersible and compatible with the toner or powder coating contents. The synthesis of the compounds should furthermore involve little expenditure and their preparation should be inexpensive.

Surprisingly, it has now been found that specific polymeric ammonium compounds based on homo- or copolymeric poly(dialkyldiallylammonium) derivatives and copolymers of poly(diallylammonium) derivatives with selected vinyl compounds are particularly effective charge control agents for electrophotographic toners and developers, and moreover can also be employed as charge-improving agents in powders and varnishes for surface coating, in particular triboelectrically or electrokinetically sprayed powder coatings.

Because of their colorless nature, high activity, good compatibility and dispersibility in the customary toner and powder coating resins and their chemical inertness, and because of the insensitivity of the charge control effect to variations in temperature and atmospheric humidity, the compounds are particularly suitable for use in color toners or developers for full color copiers and laser printers in accordance with the principle of trichromatism (subtractive color mixing), and also for colored toners or developers in general and for black toners or developers as well as for powders and powder coatings. The compounds are furthermore suitable for coating carriers or as constituents of coatings of carriers. One great technical advantage of these readily dispersible compounds is that substances of the same class of compound can be employed either as a positive or as a negative charge control agent, depending on the cation-anion combination. Problems in incorporation into the toner binder and compatibility with the toner binder after a toner base recipe has been compiled are thus minimized. Both positive and negative toners can therefore be prepared by incorporation of the desired control agent using a fixed toner base recipe (comprising toner binder, coloring agent, flow auxiliary and if appropriate other components). The synthesis requiring little expenditure, the inexpensive preparation, the high activity and the excellent heat stability are of special advantage in the case of the compounds claimed according to the invention.

The present invention thus relates to the use of polymeric ammonium compounds which have a molecular weight of about 5000 to about 500,000 and are based on poly(di-allylammonium) derivatives or copolymers thereof having molar monomer ratios of (I):(II) and (I):(III) and (II):(III) of about 0.5:0.5 to about 0.95:0.05 in the copolymer, and which are prepared by homopolymerization of monomers of the general formulae (I) or (II) or by copolymerization of mixtures of two monomers of the general formulae (I) to (III) and if appropriate subsequent anion exchange

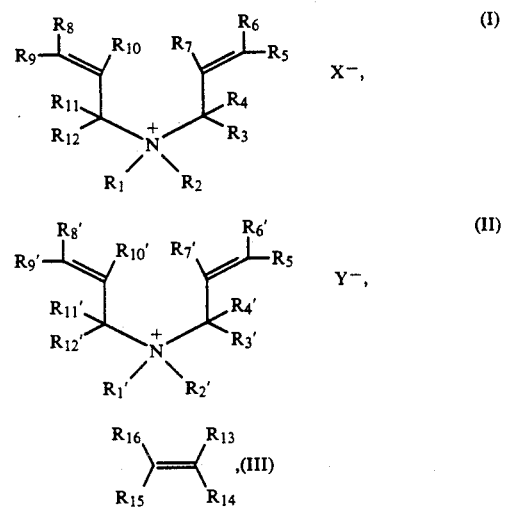

in which the radicals $R_1$ to $R_{12}$ and $R_1'$ to $R_{12}'$ independently of one another are each a hydrogen atom, a halogen atom, a hydroxyl radical, a primary, secondary or tertiary amino radical, a carboxylic acid or caboylic acid ester radical, a sulfonic acid or sulfonic acid ester radical or a cyano or nitro radical, or are each a radical based on a hydrocarbon, which can be interrupted by hetero atoms, and the radicals $R_{13}$ to $R_{16}$ independently of one another are each a hyxrogen atom, a chlorine atom, a bromine atom, a hydroxyl radical, a primary, secondary or tertiary amino radical, a carboxylic acid or carboxylic acid ester radical, a sulfonic acid or sulfonic acid ester radical or a cyano or nitro radical, or are in each case a radical based on a hydrocarbon, which can be interrupted by hetero atoms, and in which $R_1$ and $R_2$ or $R_1'$ and $R_2'$ independently of one another are hydrogen atoms, straight-chain or branched, saturated or unsaturated alkyl ($C_1$–$C_{18}$) or alkoxy($C_1$–$C_{18}$) radicals, polyoxyalkylene radicals, preferably polyoxyethylene or polyoxypropylene radicals, of the general formulas —(alkylene($C_1$–$C_5$)—O)-$n$—R, in which R is a hydrogen atom, an alkyl($C_1$–$C_4$) radical or an acryl radical, such as, for example, the acetyl, benzoyl or napthoyl radical, and n is a number from 1 to 10, aryl or heteroaryl radicals, such as, for example, phenyl, natphyl or pyridyl radicals, aralkyl radicals, such as, for example, tolyl radicals, aralkox y radicals, such as, for example, methoxyphenyl radicals, alkaryl radicals, such as, for example, benzyl radicals, or cycloaxlkyl radicals, such as, for example, cyclopentyl or cyclohexyl radicals, and $R_1$ and $R_2$ of $R_1'$ and $R_2'$ can also combine to form a saturated or unsaturated, aromatic or non-aromatic 5- to 7-membered ring system, such as, for example, the pyridinium ring system, which can contain further hetero atoms, preferably nitrogen and/or oxygen and/or sulfur atoms, such as, for example, the morpholinium ring system, and can be substituted and/or modified by fusion with or bridging to other ring systems, such as, for example, the quinolinium ring system, and in which the radicals $R_1$ and $R_2$ or $R_1'$ and $R_2'$ can contain one or more hetero atoms, such as, for example, nitrogen and/or oxygen and/or sulfur and/or phosphorus atoms, and can be substituted by halogen atoms, hydroxyl, carboxyl, sulfonic acid, cyano or mercapto radicals, carboxamide radicals, such as, for example, —NH—C(O)—alkyl($C_1$-$C_4$), sulfonamide radicals, such as, for example, —NH—$SO_2$—alkyl(-$C_1$-$C_4$), urethane radicals, such as, for example, —NH—C(O)O-alkyl($C_1$-$C_4$), keto radicals, such as, for example, —C(O)—alkyl($C_1$-$C_4$), primary, secondary or tertiary amino radicals, such as, for example, —NH[alkyl-($C_1$-$C_4$)]or —N[alkyl($C_1$-$C_4$)]$_2$, nitro radicals, ether radicals, such as, for example, —alkylene($C_1C_4$)—O—alkyl-($C_1$-$C_4$), alkyl($C_1$-$C_{30}$) or alkoxy($C_1$-$C_{30}$) radicals, aroxy radicals, such as, for example, phenoxy radicals, halogenoalkyl($C_1$-$C_{30}$) or halogenoalkoxy($C_1$-$C_{30}$) radicals or ester radicals, such as, for example, —C(O)O—alkyl($C_1$-$C_4$), and the radicals $R_3$ to $R_{12}$ or $R_3'$ to $R_{12}'$ independently of one another are hydrogen atoms, halogen atoms, straight-chain or branched, saturated or unsaturated alkyl($C_1$-$C_{18}$) or alkoxy($C_1$-$C_{18}$) radicals, polyoxyalkylene radicals, preferably polyoxyethylene or polyoxypropylene radicals, of the general formula —(alkylene($C_1C_5$)—O)$_n$—R, in which R is a hydrogen atom, an alkyl($C_1$-$C_4$) radical or an acryl radical, such as, for example, the acetyl, benzoyl or naphthoyl radical, and n is a number from 1 to 10, aryl or heteroaryl radicals, such as, for example, phenyl, naphthyl or pyridyl radicals, aralkyl radicals, such as, for example, tolyl radicals, aralkoxy radicals, such as, for example, methoxyphenyl radicals, aroxy radicals, such as, for example, phenoxy radicals, alkaryl radicals, such as, for example benzyl radicals, or cycloaxlkyl radicals, such as, for example, cyclopentyl or cyclohexyl radicals, and two of the radicals $R_3$ to $R_{12}$ or $R_3'$ to $R_{12}'$ can also combine to form a saturated or unsaturated, aromatic or non-aromatic 5- to 7-membered ring system, such as, for example, the pyridinium ring system, which can contain further hetero atoms, preferably nitrogen and/or oxygen and/or sulfur atoms, such as, for example, the morpholinium ring system, and can be substituted and/or modified by fusion with or bridging to other ring systems, such as, for example, the quinolinium ring system, and in which the radicals $R_3$ to $R_{12}$ or $R_3'$ to $r_{12}'$ can contain one or more hetero atoms, such as, for example, nitrogen and/or oxygen and/or sulfur and/or phosphorus atoms and can be substituted by halogen atoms, hydroxyl, carboxyl, sulfonic acid, cyano or mercapto radicals, carboxamide radicals, such as, for example, —NH—C(O)—alkyl($C_1$-$C_4$), sulfonamide radicals, such as, for example, —NH—$SO_2$—alkyl(-$C_1$-$C_4$), urethane radicals, such as, for example, —NH—C(O)O-alkyl($C_1$-$C_4$), keto radicals, such as, for example, —C(O)—alkyl($C_1$-$C_4$), primary, secondary or tertiary amino radicals, such as, for example, —NH[alkyl-($C_1$-$C_4$), or —N[alkyl($C_1$-$C_4$)]$_2$, nitro radicals, ether radicals, such as, for example, —alkylene($C_1$-$C_4$)—O—alkyl—($C_1$-$C_4$), alkyl($C_1$-$C_{30}$) or alkoxyl(-$C_1$-$C_{30}$) radicals, aroxy radicals, such as, for example, phenoxy radicals, halogenoalkyl($C_1$-$C_{30}$) or halogenoalkoxy($C_1$-$C_{30}$) radicals or ester radicals, such as, for example, —C(O)O—alkyl($C_1$-$c_4$), and the radicals $R_{13}$ to $R_{16}$ independently of one another are hydrogen atoms, chlorine atoms, bromine atoms, straight-chain or branched, saturated or unsaturated alkyl($C_1$-$C_{30}$) radicals, polyoxyalkylene radicals, preferably polyoxyethylene or polyoxypropylene radicals, of the general formula —(alkylene($C_1$-$C_5$)—O)$_n$—R, in which R is a hydrogen atom, an alkyl($C_1$-$C_4$) radical or an acryl radical, such as, for example, the acetyl, benzoyl or naphthoyl radical, and n is a number from 1 to 10, aryl or heteroaryl radicals, such as, for example, phenyl, naphthyl or pyridyl radicals, aralkyl radicals, such as, for example, tolyl radicals, aralkoxy radicals, such as, for example, methoxyphenyl radicals, alkaryl radicals, such as, for example, benzyl radicals, or cycloaxlkyl radicals, such as, for example, cyclopentyl or cyclohexyl radicals, carboxyl, sulfonic acid or cyano radicals, carboxamide radicals, such as, for example, —NH—C(O)—alkyl($C_1$-$C_4$), sulfonamide radicals, such as, for example, —NH—$SO_2$—alkyl($C_1$-$C_4$), ester radicals, such as, for example, —C(O)O—alkyl($C_1$-$C_4$), carboxylic radicals, such as, for example, —O—C(O)—alkyl(-$C_1$-$C_4$), keto radicals, such as, for example, —C(O)—alkyl($C_1$-$C_4$), lactam radicals, such as, for example,

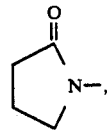

or ether radicals, such as, for example, —alkylene ($C_1$-$C_4$)—O—alkyl($C_1$—$C_4$), and in which the radicals $R_{13}$ to $R_{15}$ can contain one or more hetero atoms, such as, for example, nitrogen and/or oxygen and/or sulfur and/or phosphorus atoms, and can be substituted by chlorine or bromine atoms, hydroxyl, carboxyl, sulfonic acid, cyano or mercapto radicals, carboxamide radicals, such as, for example, —NH—C(O)—alkyl($C_1$-$C_4$), sulfonamide radicals, such as, for example, —NH—$SO_2$—alkyl—($C_1$-$C_4$), primary, secondary or tertiary amino radicals, such as, for example, —NH[alkyl(-$C_1$-$C_4$)]or —N[alkyl($C_1$-$C_4$)]$_2$, or nitro radicals, and $X^-$ and $Y^-$ are in each case the stoichiometric equivalent of an organic or inorganic anion or of a mixture of organic and/or inorganic anions, and in which, in the case of homopolymerization of monomers of the general formulae (I) or (II), $R_1$ and $R_2$ and/or $R_1'$, and $R_2'$ can be identical or different, and in which, in the case of copolymerization of mixtures of two monomers of the formulae (I) to (III), both the radicals $R_1$ and $R_2$ and/or $R_1'$ and $R_2'$ and the anions $X^-$ and $Y^-$ can be identical or different, individually or in combination, as charge control agents in electrophotographic toners and developers which are employed for copying or duplicating masters and for printing electronically, magnetically or optically stored information or in colorproofing. The compounds claimed according to the invention are moreover suitable as charge control agents in powders and varnishes for surface coating of objects made of metal, wood, plastic, glass, ceramic, concrete, textile material, paper or rubber, in particular in triboelectrically or electrokinetically sprayed powder coatings.

These compounds can furthermore also be employed as charge-improving agents in the form of coatings of carriers or a constituent of coatings of carriers which are used in developers of electrophotographic copiers or printers.

The compounds claimed according to the invention are present in an amount of about 0.01 to about 30 percent by weight, preferably about 0.1 to about 5 percent by weight, as a homogeneous distribution in the particular toner, developer, varnish or powder.

Polymeric ammonium compounds which are particularly suitable are those having a molecular weight of about 20000 to about 250,000 which are based on poly(-diallyl-ammonium) derivatives and copolymers thereof having molar monomer ratios of (I):(II) and (I):(III) and (II):(III) of about 0.5:0.5 to about 0.95:0.05 in the copolymer, and which are prepared by homopolymerization of monomers of the abovementioned formulae (I) or (II) or by copolymerization of mixtures of two monomers of the abovementioned formulae (I) to (III) and if appropriate subsequent anion exchange, in which $R_1$ and $R_2$ or $R_1'$ and $R_2'$ independently of one another are hydrogen atoms, straight-chain or branched, saturated or unsaturated alkyl($C_1$-$C_8$) or alkoxy($C_1$-$C_8$) radicals, aryl or heteroaryl radicals, such as, for example, phenyl, naphthyl or pyridyl radicals, aralkyl radicals, such as, for example, tolyl radicals, aralkoxy radicals, such as, for example, methoxyphenyl radicals, alkaryl radicals, such as, for example, benzyl radicals, or cycloaxlkyl radicals, such as, for example, cyclopentyl or cyclohexyl radicals, and in which the radicals $R_1$ and $R_2$ or $R_1'$ and $R_2'$ can be substituted by halogen atoms, hydroxyl, carboxyl or sulfonic acid radicals, carboxamide radicals, such as, for example, —NH—C(O)—alkyl($C_1$-$C_4$), sulfonamide radicals, such as, for example, —NH—SO$_2$—alkyl($C_1$-$c_4$), keto radicals, such as, for example, —C(O)—alkyl($C_1$-$c_4$), primary, secondary or tertiary amino radicals, such as, for example, —NH[alkyl($C_1$-$C_4$)]or —N[alkyl($C_1$-$C_4$)]$_2$, nitro radicals, ether radicals, such as, for example,—alkylene($C_1$-$C_4$)—O—alkyl($C_1$-$C_4$), alkyl($C_1$-$C_4$) or alkoxy($C_1$-$C_4$) radicals, aroxy radicals, such as, for example, phenoxy radicals, halogenoalkyl($C_1$-$D_4$) or halogenoalkoxy($C_1$-$C_4$) radicals or ester radicals, such as, for example, —C(O)O—alkyl($C_1$-$C_4$), and the radicals $R_3$ to $R_{12}$ or $R_3'$ to $R_{12}'$ independently of one another are hydrogen atoms, halogen atoms, straight-chain or branched, saturated or unsaturated alkyl($C_1$-$C_8$) or alkoxy($C_1$-$C_8$) radicals, aryl or heteroaryl radicals, such as, for example, phenyl, naphthyl or pyridyl radicals, aralkyl radicals, such as, for example, tolyl radicals, aralkoxy radicals, such as, for example, methoxyphenyl radicals, aroxy radicals, such as, for example, phenoxy radicals, alkaryl radicals, such as, for example benzyl radicals, or cycloaxlkyl radicals, such as, for example, cyclopentyl or cyclohexyl radicals, and in which the radicals $R_3$ and $R_{12}$ or $R_3'$ and $R_{12}'$ can be substituted by halogen atoms, hydroxyl, carboxyl or sulfonic acid radicals, carboxamide radicals, such as, for example,—NH—C(O)—alkyl($C_1$-$C_4$), sulfonamide radicals, such as, for example,—NH—SO$_2$—alkyl($C_1$-$C_4$), keto radicals, such as, for example,—C(O)—alkyl($C_1$-$C_4$), primary, secondary or tertiary amino radicals, such as, for example, —NH[alkyl—($C_1$-$C_4$)], —N[alkyl($C_1$-$C_4$)]$_2$, nitro radicals, ether radicals, such as, for example, —alkylene($C_1$-$C_4$)O—alkyl—($C_1$-$C_4$), alkyl($C_1$-$C_4$) or alkoxy($C_1$-$C_4$) radicals, aroxy radicals, such as, for example, phenoxy radicals, halogenoalkyl($C_1$-$C_4$) or halogenoalkoxy($C_1$-$C_4$) radicals or ester radicals, such as, for example,—C(O)O—alkyl($C_1$-$C_4$), and the radicals $R_{13}$ to $R_{16}$ independently of one another are hydrogen atoms, straight-chain or branched, saturated or unsaturated alkyl($C_1$-$C_8$) radicals, aryl or heteroaryl radicals, such as, for example, phenyl, naphthyl or pyridyl radicals, aralkyl radicals, such as, for example, tolyl radicals, aralkoxy radicals, such as, for example, methoxyphenyl radicals, alkaryl radicals, such as, for example, benzyl radicals, cycloaxlkyl radicals, such as, for example, cyclopentyl or cyclohexyl radicals, carboxyl, sulfonic acid or cyano radicals, ester radicals, such as, for example, —C(O)O—alkyl($C_1$-$C_4$), carboxylic radicals, such as, for example, —O—C(O)—alkyl($C_1$-$C_4$), carboxamide radicals, such as, for example, —NH—C(O)—alkyl($C_1$-$C_4$), sulfonamide radicals, such as, for example, —NH—SO$_2$—alkyl($C_1$-$c_4$), keto radicals, such as, for example, —C(O)—alkyl($C_1$-$C_4$), lactam radicals, such as, for example,

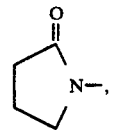

or ether radicals, such as, for example, —alkylene($C_1$-$C_4$)—O—alkyl($C_1$-$C_4$), and in which the radicals $R_{13}$ to $R_{16}$ can be substituted by chlorine or bromine atoms, hydroxyl, carboxyl, sulfonic acid, cyano or mercapto radicals, carboxamide radicals, such as, for example, —NH—CO—alkyl($C_1$-$C_4$), sulfonamide radicals, such as, for example, —NH—SO$_2$—alkyl($C_1$-$C_4$), primary, secondary or tertiary amino radicals, such as, for example, —NH—[alkyl($C_1$-$C_4$)]or —N[alkyl($C_1$-$C_4$)]$_2$, or nitro radicals, and S$^-$ and Y$^-$ in each case are the stoichiometric equivalent of an anion or of a mixture of anions, such as, for example, F$^-$, Cl$^-$, Br$^-$, I$^-$, NO$_3^-$, OH$^-$, HSO$_4^-$, SO$_4^{2-}$, S$^{2-}$, SO$_3^{2-}$, S$_2$O$_3^{2-}$, HCO$_3^-$, CO$_3^{2-}$, H$_2$PO$_4^-$, HPO$_4^{2-}$, PO$_4^{3-}$, CN$^-$, cyanate, isocyanate, thiocyanate, zinc tetracyanate, zinc tetrathiocyanate, perchlorate, BF$_4^-$, PF$_6^-$, B(aryl)$_4^-$, such as, for example, tetraphenyl borate, tetra(fluorophenyl) borate, tetra(chlorophenyl) borate, tetratolyl borate, tetranaphthyl borate, tetra(methoxyphenyl) borate, tetrabiphenyl borate, tetrabenzyl borate or tetrapyridyl borate, ethyl- and methyl-sulfate, phenolate, nitrophenolate, saturated or unsaturated, aliphatic, cycloaliphatic or aromatic carboxylic or sulfonate, such as, for example, acetate, lactate, benzoate, salicylate, 2-hydroxy-3-naphthoate, 2-hydroxy-6-naphthoate, ethylsulfonate, phenylsulfonate or tosylate, and furthermore perfluorinated saturated or unsaturated, aliphatic, cycloaliphatic or aromatic carboxylic or sulfonate, such as, for example, perfluoroacetate, perfluoroalkyl benzoate, perfluoroethylsulfonate or perfluoroalkyl-benzenesulfonate, and saturated or unsaturated, aliphatic, cycloaliphatic or aromatic di- or tricarboxylate, such as, for example, citrate, oxalate or succinate, or di- or trisulfonate, tungstate, molybdate or a heteropolyacid anion, such as, for example, phosphomolybdate or -tungstate, silicomolybdate or -tungstate, the anions F$^-$, Cl$^-$, Br$^-$, I$^-$, BF$_4^-$, B(aryl)$_4^-$, PF$_6^-$ and P(Mo$_3$O$_{10}$)$_4^{3-}$ being especially suitable.

Examples of especially suitable compounds are homopolymers of

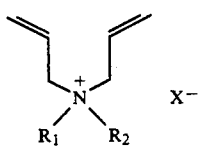

where X⁻=Cl⁻, BF₄⁻, B(phenyl)₄⁻ or PF₆⁻, R₁=H or CH₃ and R₂=CH₃ or C₈H₁₇ and the compounds have a molecular weight of about 20,000 to about 250,000, copolymers of

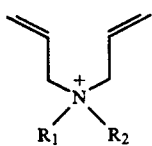 X⁻ and 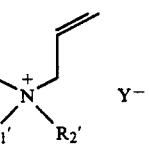 Y⁻ where X⁻ and Y⁻=Cl⁻, BF₄⁻, B(phenyl)₄⁻ or PF₆⁻, R₁ and R₁'=H or CH₃ and R₂ and R₂'=CH₃ or C₈H₁₇, and the compounds have a molecular weight of about 20,000 to about 250,000 and a molar monomer ratio in the copolymer of about 0.5:0.5 to about 0.95:0.05, copolymers of

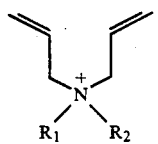 X⁻ and 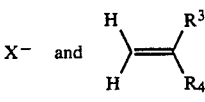

where X⁻ and Y⁻=Cl⁻, $^{BF_4^-}$, B(phenyl)₄⁻ or PF₆⁻, R₁=H or CH₃, R₂=CH₃ or C₈H₁₇, R₃=H or CH₃ and R₄=COOH, C(O)OCH₃, C(O)OC₂H₅, C(O)NH₂, OC(O)CH₃ or CN, and the compounds have a molecular weight of about 20,000 to about 250,000 and a molar monomer ratio in the copolymer of about 0.5:0.5 to about 0.95:0.05.

Examples which may be mentioned of individual compounds are a homopolymer of (1)
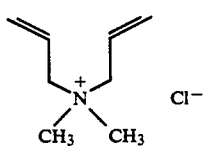

having a molecular weight of about 100,000, a homopolymer of (2)
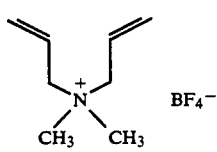

having a molecular weight of about 100,000, a homopolymer of (3)
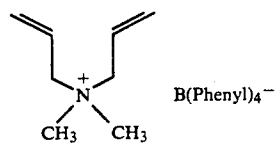

having a molecular weight of about 100,000, a homopolymer of (4)
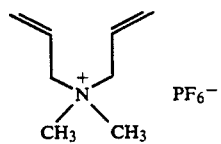

having a molecular weight of about 100,000, a copolymer of (5)
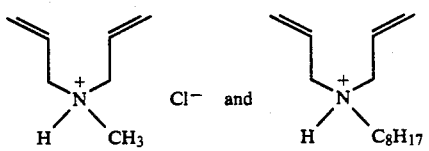

having a molecular weight of about 100,000 and a molar monomer ratio in the copolymer of about 0.8:0.2, a copolymer of (6)
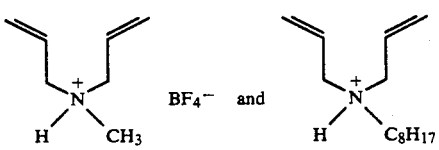

having a molecular weight of about 100,000 and a molar monomer ratio in the copolymer of about 0.8:0.2, a copolymer of (7)
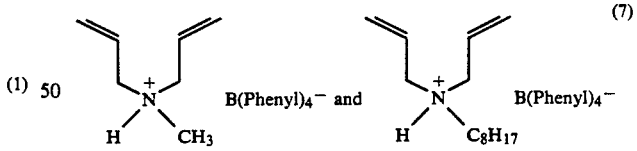

having a molecular weight of about 100,000 and a molar monomer ratio in the copolymer of about 0.8:0.2, a copolymer of (8)
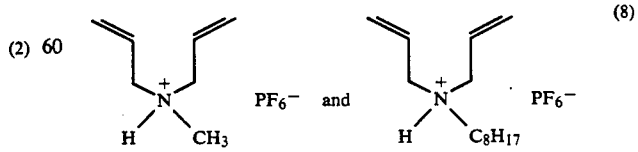

having a molecular weight of about 100,000 and a molar monomer ratio in the copolymer of about 0.8:0.2, a copolymer of

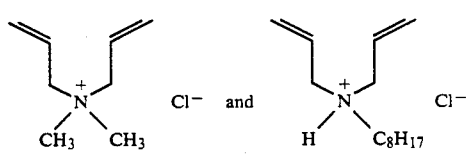 (9)

having a molecular weight of about 100,000 and a molar monomer ratio in the copolymer of about 0.8:0.2, a copolymer of

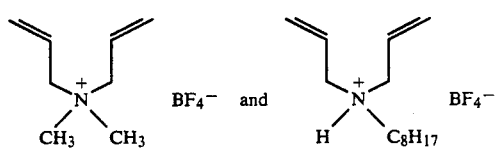 (10)

having a molecular weight of about 100,000 and a molar monomer ratio in the copolymer of about 0.8:0.2, a copolymer of

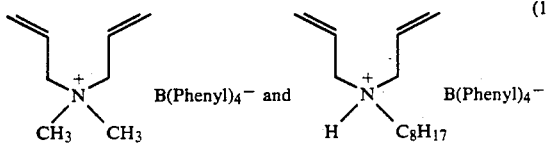 (11)

having a molecular weight of about 100,000 and a molar monomer ratio in the copolymer of about 0.8:0.2, a copolymer of

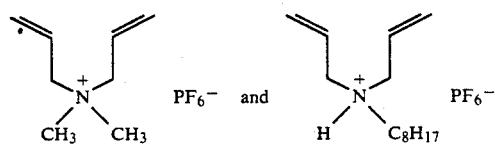 (12)

having a molecular weight of about 100,000 and a molar monomer ratio in the copolymer of about 0.8:0.2, a copolymer of

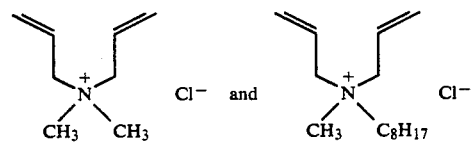 (13)

having a molecular weight of about 100,000 and a molar monomer ratio in the copolymer of bout 0.95:0.05, a copolymer of

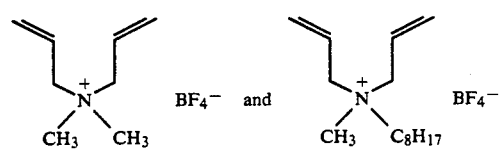 (14)

having a molecular weight of about 100,000 and a molar monomer ratio in the copolymer of about 90.95:0.05, a copolymer of

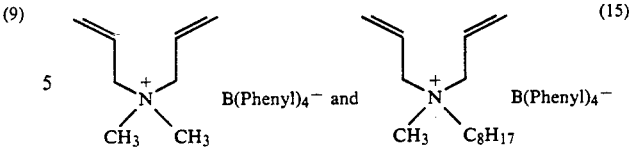 (15)

having a molecular weight of about 100,000 and a molar monomer ratio in the copolymers of bout 0.95:0.05, a copolymer of

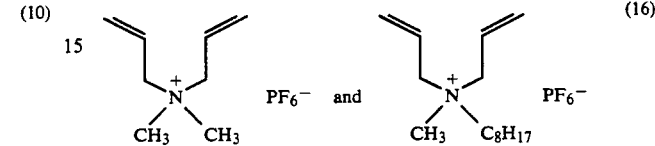 (16)

having a molecular weight of about 100,000 and a molar monomer ratio in the copolymer of 0.95:0.05, a copolymer of

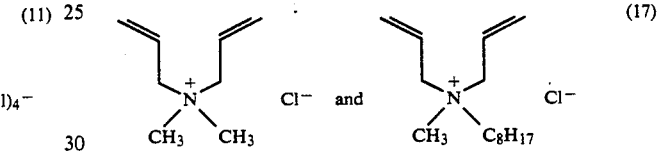 (17)

having a molecular weight of about 100,000 and a molar monomer ratio in the copolymer of 0.8:0.2, a copolymer of

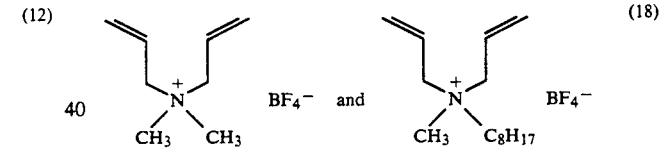 (18)

having a molecular weight of about 100,000 and a molar monomer ratio in the copolymer of about 0.8:0.2, a copolymer of

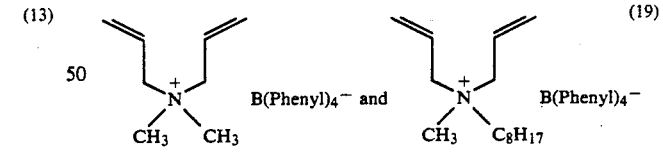 (19)

having a molecular weight of about 100,000 and a molar monomer ratio in the copolymer of about 0.8:0.2, a copolymer of

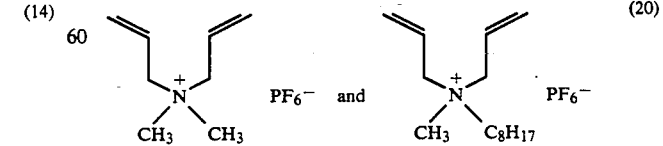 (20)

having a molecular weight of about 100,000 and a molar monomer ratio in the copolymer of 0.8:0.2, a copolymer of

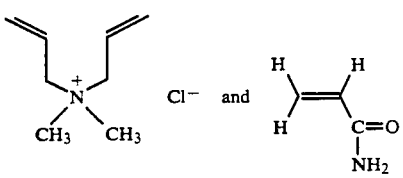

(21)

having a molecular weight of about 100,000 and a molar monomer ratio in the copolymer of about 0.8:0.2,
a copolymer of

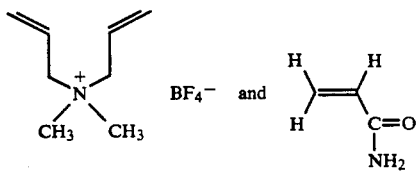

(22)

having a molecular weight of about 100,000 and a molar monomer ratio in the copolymer of about 0.8:0.2,
a copolymer of

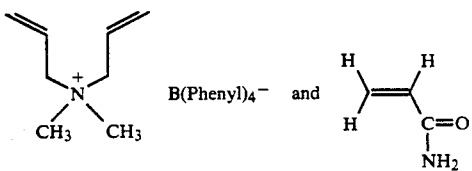

(23)

having a molecular weight of about 100,000 and a molar monomer ratio in the copolymer of about 0.8:0.2,
a copolymer of

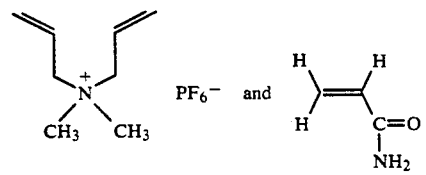

(24)

having a molecular weight o about 100,000 and a molar monomer ratio in the copolymer of about 0.8:0.2.

The compounds of the general formulae (I) to (III) and the homo- or copolymers thereof are prepared in a manner which is known per se and which is described in detail in the literature [for example G.B. Butler, R.J. Angelo, J. Am. Chem. Soc. 79(1957), 3128–31; G.B. Butler in: E.J. Goethals, "Polymeric Amines and Ammonium Salts", Pergamon Press, 1980, 125–42; D.H. Solomon, D.G. Hawthorne, J. Macromol. Sci.-Rev. Macromol. Chem. C15(1976), 143–64; Houben-Weyl, "Methoden der Organischen Chemie (Methods of Organic Chemistry)", Volume XIV/1, Thieme-Verlag, Stuttgart, 1961, 561–1182; K. Weissermel, H.-J. Arpe, "Industrielle Organische Chemie (Industrial Organic Chemistry)", Verlag Chemie, Weinheim, 1988, 230–51; East German Patent 127,729; European Patent 0,103,698; and U.S. Pat. No. 3,288,770].

The compounds of the general formulae (I) and (II) are thus prepared, for example, by reaction of allyl halides with N,N-dialkylallylamines or by reduction of alkyl nitriles with subsequent reaction of the amine with allyl halides and quaternization of the diallylamine.

Compounds of the general formula (III) are prepared, for example, by addition of hydrogen halides onto ethine, from ethylenechlorohydrin by reaction with NaCN and alcohols, from esterification of lactic acid with subsequent thermolysis, by reaction of ethene with acetic acid, by Friedel—Crafts alkylation of aromatics with subsequent cracking, by ammonoxidation of propene or by catalytic hydrolysis of acrylamide.

Homopolymers of monomers of the general formulae (I) and (II) and copolymers of mixtures of two monomers of the general formulae (I) to (III) are prepared, for example, by free radical homo- or copolymerization under an inert gas in polar solvents, such as, for example, water or dimethylformamide, with the said of free radical initiators, such as, for example, t-butyl hydroperoxide or ammonium peroxydisulfate, the halide salts preferably being employed as monomers.

The various salts, for example of the compounds (2) to (4), (6) to (8), (10) to (12), (14) to (16). (18) to (20) and (22) to (24) are prepared by anion exchange, for example by precipitation from an aqueous medium, as described in the preparation examples.

The particular advantage of the compounds claimed according to the invention is that they are colorless and have a high charge control effect, and that this is constant over a prolonged activation period (up to 24 hours). Thus, for example, a test toner containing 1 percent by weight of the compound (3) exhibits a charge of $-8$ $\mu C/g$ after 10 minutes, $-21$ $\mu C/g$ after 30 minutes, $-31$ $\mu C/g$ after 2 hours and $-33$ $\mu C/g$ after 24 hours (Use Example 3). A test toner containing 1 percent by weight of the compound (13) exhibits the following behavior: $+30$ $\mu C/g$ after 10 minutes, $+25$ $\mu C/g$ after 30 minutes, $+16$ $\mu C/g$ after 2 hours and $+12$ $\mu C/g$ after 24 hours (Use Example 10). A test toner containing 1 percent by weight of the compound (15) exhibits the following values: $-20$ $\mu C/g$ after 10 minutes, $-28$ $\mu C/g$ after 30 minutes, $-33$ $\mu C/g$ after 2 hours and $-33$ $\mu C/g$ after 24 hours (Use Example 11).

A test powder coating containing 1 percent by weight of the compound (3) exhibits a charge of $-3$ $\mu C/g$ after 10 minutes, $-1$ $\mu C/g$ after 30 minutes, $+4$ $\mu C/g$ after 2 hours and $+2$ $\mu C/g$ after 24 hours (Use Example 5). A test powder coating containing 1 percent by weight of the compound (1) exhibits a charge of $-6$ $\mu C/g$ after 10 minutes, $-7$ $\mu C/g$ after 30 minutes, $-7$ $\mu C/g$ after 2 hours and $-6$ $\mu C/g$ after 24 hours (Use Example 6). The high charge control effect becomes all the more clear when, for example, the charging properties of the pure toner binder "Dialec S-309" (Comparison Example 1: $-4$ $\mu C/g$ after 10 minutes, $-12$ $\mu C/g$ after 30 minutes, $-27$ $\mu C/g$ after 2 hours, $-48$ $\mu C/g$ after 24 hours), the pure powder coating binder "Alftalat AN 757" (Comparison Example 2: $-35$ $\mu C/g$ after 10 minutes, $-32$ $\mu C/g$ after 30 minutes, $-24$ $\mu C/g$ after 2 hours, $-13$ $\mu C/g$ after 24 hours) and the pure powder coating binder "Alftalat AN 792" (Comparison Example 3: $-15$ $\mu C/g$ after 10 minutes, $-17$ $\mu C/g$ after 30 minutes, $-13$ $\mu C/g$ after 2 hours, $-2$ $\mu C/g$ after 24 hours) are considered for comparison. In Use Examples 7, 8 and 9, the high charge control effect is particularly clear on comparison with the Comparison Examples 4, 5 and 6, since coloring agents which present triboelectrical problems (C.I. Pigment Red 57:1 and C.I. Solvent Blue 125) were additionally also used.

It is of great importance in practice that the compounds claimed according to the invention are chemically inert and readily compatible with binders, such as, for example, styrene acrylates, polyesters, epoxides and polyurethanes. The compounds are furthermore heat-stable and can thus be incorporated into the usual binders by the usual processes (extrusion or kneading) under the customary conditions (temperatures between 100° C. and 200° C.) without difficulties. Synthesis of the compounds claimed according to the invention involves little expenditure and the products are obtained in a high purity.

The compounds used according to the invention are as a rule incorporated homogeneously into the particular binder in a concentration of about 0.01 to about 30 percent by weight, preferably about 0.1 to 5.0 percent by weight, in a known manner, for example by extrusion or kneading. The charge control agents for toners or charge-improving agents for powders and varnishes for surface coating, in particular for triboelectrically or electro-kinetically sprayed powder coatings, can be added here as dried and ground powders, dispersions or solutions, press-cakes or a masterbatch, as compounds absorbed on suitable carriers, such as, for example, silica gel, $TiO_2$ or $Al_2O_3$, from an aqueous or non-aqueous solution or in another form. The compounds employed according to the invention can likewise in principle also be already added during preparation of the particular binders, that is to say in the course of their polymerization, polyaddition or polycondensation. The level of the electrostatic charge of the electrophotographic toners or powder coatings in which the charge control agents claimed according to the invention have been incorporated homogeneously was measured on standard test systems under identical conditions (such as the same dispersion times, same particle size distribution and same particle shape) at room temperature and 50% relative atmospheric humidity. The toner or powder coating was charged electrostatically by whirling with a carrier, that is to say a standardized friction partner (3 parts by weight of toner for 97 parts by weight of carrier), on a roller stand (150 revolutions per minute). The electrostatic charge was then measured on a customary q/m measuring stand (compare J.H. Dessauer, H.E. Clark, "Xerography and related Processes", Focal Press, N.Y., 1965, page 289; J.F. Hughes, "Electrostatic Powder Coating", Research Studies Press Ltd., Letchworth, Hertfordshire, England, 1984, Chapter 2). The particle size has a major influence in the determination of the q/m value, which is why strict attention has been paid to a standard particle size distribution in the toner and powder coating samples obtained by sifting.

The following examples serve to illustrate the invention, without limiting it thereto. The parts stated are parts by weight.

PREPARATION EXAMPLES

Preparation Example 1

10 g (0.06 mol) of a homopolymer of diallyldimethylammonium chloride (molecular weight about 100,000 g/mol) are dissolved in 200 ml of water, and 7.5 g (0.07 mol) of sodium tetrafluoroborate, dissolved in 100 ml of water, are slowly added dropwise at room temperature, while stirring. The white precipitate is filtered off with suction, washed free from chloride with water and dried at 100° C. in a vacuum cabinet.

Yield : 12.2 g (92.4% of theory) of the compound (2), white powder.

Melting point :>300° C. (decomposition).

Elemental analysis: calculated 45.1 % C, 7.5 % H, 6.6 % N, 35.7 % F. found 44.5 % C, 7.9 % H, 6.5 % N, 33.4 % F.

Preparation Example 2

The procedure is as in Preparation Example 1, but instead of sodium tetrafluoroborate, 23.9 g (0.07 mol) of sodium tetraphenylborate are used.

Yield : 27.2 g (98.7% of theory) of the compound (3), white powder.

Melting point : 225° C.

Elemental analysis: calculated 86.3 % C, B.1 % H, 3.1 % N, 2.4 % B. found 84.2 % C, 8.1 % H, 3.4 % N, 2.0 % B.

Preparation Example 3

10 g (0.06 mol) of a copolymer of diallyldimethylammonium chloride and diallylmethyloclyIammonium chloride (molecular weight about 100,000 g/mol, molar ratio of the monomer units in the copolymer about 0.8 to 0.2) are dissolved in 400 ml of water, and 7.5 g (0.07 mol) of sodium tetrafluoroborate, dissolved in 100 ml of water, are slowly added dropwise at room temperature, while stirring. The white precipitate is filtered off with suction, washed free from chloride with water and dried at 100° C. in a vacuum cabinet.

Yield : 12.4 g (89.9% of theory) of the compound (10), white powder.

Melting point : >300° C. (decomposition).

Elemental analysis: calculated 48.0% C, 8.0% H, 6.1% N, 33.0% F. found 46.9% C, 8.2% H, 6.2% N, 32.7% F.

Preparation Example 4

The procedure is as in Preparation Example 3, but instead of sodium tetrafluoroborate, 24.0 g (0.07 mol) of sodium tetraphenylborate, dissolved in 150 ml of water, are used.

Yield : 26.7 g (96.3% of theory) of the compound (11), white powder.

Melting point : 205°–210° C.

Elemental analysis: calculated 86.2% C, 8.3% H, 3.0% N, 2.4% B; found 85.6% C, 8.4% H, 3.3% N, 2.2% B.

Preparation Example 5

10 g (0.06 mol) of a copolymer of diallyldimethylammonium chloride and diallylmethyloclyiammonium chloride (molecular weight about 100,000 g/mol, molar ratio of the monomer units in the copolymer about 0.95 to 0.05) are dissolved in 400 ml of water, and 7.5 g (0.07 mol) of sodium tetrafluoroborate, dissolved in 100 ml of water, are slowly added dropwise at room temperature, while stirring. The slightly amber-colored precipitate is filtered off with suction, washed free from chloride with water and dried at 100° C. in a vacuum cabinet.

Yield :9.5 g (72.0% of theory) of the compound (14), slightly amber-colored powder.

Melting point : 270° C. (decomposition).

Elemental analysis: calculated 46.0% C, 7.7% H, 6.4% N, 5.0% B; found 45.5% C, 8.0% H, 6.7% N, 4.3% B.

Preparation Example 6

The procedure is as in Preparation Example 5, but instead of sodium tetrafluoroborate, 24.0 g (0.07 mol) of sodium tetraphenylborate, dissolved in 150 ml of water, are used.

Yield : 25.8 g (95.6% of theory) of the compound (15), white powder.

Melting point : 240° C.

Elemental analysis: calculated 86.3 % C, 8.2 % H, 3.1 % N, 2.4 % B; found 85.7 % C, 8.8 % H, 3.0 % N, 2.2 % B.

Preparation Example 7

10 g (0.08 mol) of a copolymer of diallyldimethylammonium chloride and acrylamide (molecular weight about 100,000 g/mol, molar ratio of the monomer units in the copolymer about 0.8 to 0.2) are dissolved in 400 ml of water, and 9.9 g (0.09 mol) of sodium tetrafluoroborate, dissolved in 200 ml of water, are slowly added dropwise at room temperature, while stirring. The white precipitate is filtered off with suction, washed free from chloride with water and dried at 100° C. in a vacuum cabinet.

Yield : 11.6 g (78.2% of theory) of the compound (22), white powder.

Melting point : >300° C. (decomposition).

Elemental analysis: calculated 45.4 % C, 7.5 % H, 7.6 % N, 4.8 % B; found 45.1 % C, 7.7 % H, 7.4 % N, 4.3 % B.

USE EXAMPLES

Use Example 1

1.0 part of the compound (1) was homogeneously incorporated into 99.0 parts of toner binder ("Dialec S-309" from Diamond Shamrock, styrene-methacrylate copolymer 0:40) for 45 minutes by means of a kneader from Werner & Pfleiderer (Stuttgart). The mixture was then ground on a 100 LU universal laboratory mill (Alpine, Augsburg) and then graded on a 100 MZR centrifugal sifter (Alpine). The desired particle fraction (4–25 μm) was activated with a carrier of magnetite particles, coated with styrene-methacrylate copolymer 90:10, of size 50–200 μm of the type "90 μm Xerographic Carrier" from Plasma Materials Inc. (Manchester, NH, USA).

The measurement was carried out on a customary q/m measuring stand (Epping GmBH, Neufahrn). By using a sieve of 25 μm mesh width (Gebr. Kufferath, Duren), it was ensured that no carrier could be entrained when the toner was blown off. The measurements were made at room temperature and 50% relative atmospheric humidity.

The following q/m values [μC/g] were measured as a function of the activation time:

| Activation time | q/m [μC/g] |
| --- | --- |
| 10 minutes | −4 |
| 30 minutes | −8 |
| 2 hours | −13 |
| 24 hours | −19 |

Use Example 2

0.5 part of the compound (3) was incorporated homogeneously into 99.5 parts of toner binder as described in Use Example 1. The following q/m values [μC/g] were measured as a function of the activation time:

| Activation time | q/m [μC/g] |
| --- | --- |
| 10 minutes | +1 |
| 30 minutes | −5 |
| 2 hours | −14 |
| 24 hours | −26 |

Use Example 3

1.0 part of the compound (3) was incorporated homogeneously into 99.0 parts of toner binder as described in Use Example 1. The following q/m values [μC/g] were measured as a function of the activation time:

| Activation time | q/m [μC/g] |
| --- | --- |
| 10 minutes | −8 |
| 30 minutes | −21 |
| 2 hours | −31 |
| 24 hours | −33 |

Use Example 4

2.5 parts of the compound (3) were incorporated homogeneously into 97.5 parts of toner binder as described in Use Example 1. The following q/m values [μC/g] were measured as a function of the activation time:

| Activation time | q/m [μC/g] |
| --- | --- |
| 10 minutes | −1 |
| 30 minutes | −6 |
| 2 hours | −15 |
| 24 hours | −25 |

Use Example 5

1.0 part of the compound (3) was incorporated homogeneously into 99.0 parts of powder coating binder ("Alftalat AN 757" from Hoechst AG, polyester resin containing carboxyl groups) as described in Use Example 1. The following q/m values [μC/g] were measured as a function of the activation time:

| Activation time | q/m [μC/g] |
| --- | --- |
| 10 minutes | −3 |
| 30 minutes | −1 |
| 2 hours | +4 |
| 24 hours | +2 |

Use Example 6

1.0 part of the compound (1) was incorporated homogeneously into 99.0 parts of powder coating binder ("Alftalat AN 792" from Hoechst AG, polyester resin containing hydroxyl groups) as described in Use Example 1. The following q/m values [μC/g] were measured as a function of the activation time:

| Activation time | q/m [μC/g] |
|---|---|
| 10 minutes | −6 |
| 30 minutes | −7 |
| 2 hours | −7 |
| 24 hours | −6 |

Use Example 7

2.5 parts of the compound (3) and 2.5 parts of the coloring agent C.I. Solvent Blue 125 were incorporated homogeneously into 95.0 parts of toner binder as described in Use Example 1. The following q/m values [μC/g] were measured as a function of the activation time:

| Activation time | q/m [μC/g] |
|---|---|
| 10 minutes | +2 |
| 30 minutes | −2 |
| 2 hours | −5 |
| 24 hours | −9 |

Use Example 8

2.5 parts of the compound (3) and 2.5 parts of the coloring agent C.I. Pigment Red 57:1 were incorporated homogeneously into 95.0 parts of toner binder as described in Use Example 1. The following q/m values [μC/g] were measured as a function of the activation time:

| Activation time | q/m [μC/g] |
|---|---|
| 10 minutes | −21 |
| 30 minutes | −30 |
| 2 hours | −35 |
| 24 hours | −38 |

Use Example 9

1.0 part of the compound (3) and 5.0 parts of the coloring agent C.I. Pigment Red 57:1 were incorporated homogeneously into 94.0 parts of toner binder as described in Use Example 1. The following q/m values [μC/g] were measured as a function of the activation time:

| Activation time | q/m [μC/g] |
|---|---|
| 10 minutes | −8 |
| 30 minutes | −15 |
| 2 hours | −25 |
| 24 hours | −27 |

Use Example 10

1.0 part of the compound (13) was incorporated homogeneously into 99.0 parts of toner binder as described in Use Example 1. The following q/m values [μC/g] were measured as a function of the activation time:

| Activation time | q/m [μC/g] |
|---|---|
| 10 minutes | +30 |
| 30 minutes | +25 |
| 2 hours | +16 |
| 24 hours | +12 |

Use Example 11

1.0 part of the compound (15) was incorporated homogeneously into 99.0 parts of toner binder as described in Use Example 1. The following q/m values [μC/g] were measured as a function of the activation time:

| Activation time | q/m [μC/g] |
|---|---|
| 10 minutes | −20 |
| 30 minutes | −28 |
| 2 hours | −33 |
| 24 hours | −33 |

Comparison Example 1

(to Use Examples 1 to 4 and 10–11)

100 parts of the toner binder "Dialec S-309" described in Use Example 1 were kneaded in a kneader for 45 minutes as described in Use Example 1, without further additives, and then ground, classified and measured on a q/m measuring stand. The following q/m values [μC/g] were measured as a function of the activation time:

| Activation time | q/m [μC/g] |
|---|---|
| 10 minutes | −4 |
| 30 minutes | −12 |
| 2 hours | −27 |
| 24 hours | −48 |

Comparison Example 2

(to Use Example 5)

The procedure was as in Comparison Example 1, but instead of the toner binder "Dialec S-309", the powder coating binder "Alftalat AN 757" was used. The following q/m values [μC/g] were measured as a function of the activation time:

| Activation time | q/m [μC/g] |
|---|---|
| 10 minutes | −35 |
| 30 minutes | −32 |
| 2 hours | −24 |
| 24 hours | −13 |

Comparison Example 3

(to Use Example 6)

The procedure was as in Comparison Example 1, but instead of the toner binder "Dialec S-309", the powder coating binder "Alftalat AN 792" was used. The following q/m values [μC/g] were measured as a function of the activation time:

| Activation time | q/m [μC/g] |
| --- | --- |
| 10 minutes | −15 |
| 30 minutes | −17 |
| 2 hours | −13 |
| 24 hours | −2 |

Comparison Example 4

(to Use Example 9)

5.0 parts of the coloring agent C.I. Pigment Red 57:1 were incorporated homogeneously into 95.0 parts of toner binder as described in Use Example 1. The following q/m values [μC/g] were measured as a function of the activation time:

| Activation time | q/m [μC/g] |
| --- | --- |
| 10 minutes | −3 |
| 30 minutes | −20 |
| 2 hours | −52 |
| 24 hours | −64 |

Comparison Example 5

(to Use Example 8)

2.5 parts of the coloring agent C.I. Pigment Red 57:1 were incorporated homogeneously into 97.5 parts of toner binder as described in Use Example 1. The following q/m values [μC/g] were measured as a function of the activation time:

| Activation time | q/m [μC/g] |
| --- | --- |
| 10 minutes | +3 |
| 30 minutes | −4 |
| 2 hours | −21 |
| 24 hours | −46 |

Comparison Example 6

(to Use Example 7)

2.5 parts of the coloring agent C.I. Solvent Blue 125 were incorporated homogeneously into 97.5 parts of toner binder as described in Use Example 1. The following q/m values [μC/g] were measured as a function of the activation time:

| Activation time | q/m [μC/g] |
| --- | --- |
| 10 minutes | +3 |
| 30 minutes | +5 |
| 2 hours | +6 |
| 24 hours | +5 |

We claim:

1. A powdered resin-containing composition capable of obtaining an electrostatic charge for copying or duplicating masters or for printing electronically, magnetically, or optically stored information or for colorproofing or for surface coating of an object by means of a corna process or a triboelectric or electrokinetic process or a combination of corona and triboelectric or electrokinetic processes, said composition comprising:

a powder coating resin or powdered toner binder comprising a resin, and a polymeric ammonium salt charge control or charge-improving agent having a moleculr weight of about 5000 to about 500,000, said charge control or charge-improving agent having been obtained by homopolymerization of monomers of the formulae I or II or copolymerization of essentially two of the three monomers I, II, and III in essentially a molar monomer ratio I:II, I:III, or II:III ranging from about 0.5:0.5 to about 9.95:0.5 in the copolymer, optionally with subsequent anion exchange, said formulae I, II, and III being

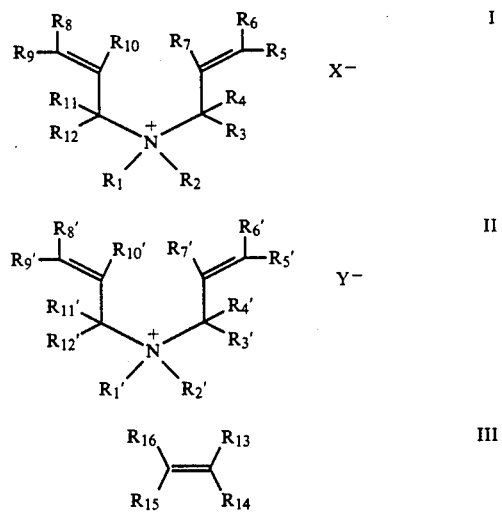

wherein, in said formulae I, II, and III:

$R_1$ to $R_{12}$ and $r_1'$ to $R_{12}'$ independently of one another are each a hydrogen atom, a halogen atom, a hydroxy radical, a primary, secondary or tertiary amino radical, a carboxylic acid or carboxylic acid ester radical, a sulfonic acid or sulfonic acid ester radical or a cyano or nitro radical, or are each a radical based on a hydrocarbon that is optionally interrupted by hetero atoms, and X and Y are in each case the stoichiometric equivalent of an organic or inorganic anion or of a mixture of organic, inorganic, or inorganic and organic anions, and the radicals $R_{13}$ to $R_{16}$ independently of one another are each a hydrogen atom, a chlorine atom, a bromine atom, a hydroxyl radical, a primary, secondary or tertiary amino radical, a carboxylic acide or carboxylic acid ester radical, a sulfonic acid or sulfonic acid ester radical or a cyano or nitro radical, or are in each case a radical based on a hydrocarbon that is optionally interrupted by hetero atoms.

2. A composition as claimed in claim 1, wherein said composition is a powder for surface coating and contains a powder coating resin for triboelectric or electrokinetic spray-coating of an object, and said charge control or charge-improving agent is combined with the powder coating resin in the form of a dried, ground powder, a dispersion, a solution, a prescake, a masterbatch, or as a compound absorbed on a carrier.

3. A composition as claimed in claim 2, wherein said powder coating resin comprises a resin selected from eh group consisting an epoxy, polyester, polyurethane, add acrylic resin, or a combination thereof, together with a hardener for said resin.

4. A composition as claimed in claim 1, wherein said composition is a toner containing a particulate binder resin, and said charge-control or charge-improving agent is a charge control agent which has been incorporated into the particulate binder resin.

5. A composition as coaiec in claim 4, wherein the toner contains a coloring agent in addition to the binder and the charge-control agent.

6. A composition as claimed n claim 4, wherein the binder is a styrene acrylate, a polyester, an epoxide, or a polyurethane.

7. A composition as claimed in claim 4, wherein the charge-control agent is homogeneously incorporated int the particulate binder resin in a concentration of about 0.01 to about 30 percent by weight.

8. A composition as claimed in claim 1, wherein said composition further comprises a carrier, said carrier being magnetite particles, or a magnetic pigment.

9. A composition as claimed in claim 1, in which:
$R_1$ and $R_2$ or $R_1'$ and $R_2'$ independently of one another are hydrogen atoms, straight-chain or branched, saturated or unsaturated alkyl($C_1$–$C_{18}$) or alkoxy($C_1$–$C_{18}$) radicals, polyoxyalkylene radicals of the formula —($C_1$–"$C_5$—alkylene—O)$_n$—R, in which R is a hydrogen atom, an $C_1$–$C_4$ alkyl radical or an acryl radical and n is a number from 1 to 10, aryl or heteroaryl radicals or aralkyl, aralkoxy, alkaryl or cycloaxlkyl radicals, or $R_1$ and $R_2$ or $R_1'$ and $R_2'$ are optionally combined to form a saturated or unsaturated, aromatic or non-aromatic 5- to 7-membered ring system, which optionally contains further hetero atoms and is optionally substituted or modified or substituted and modified by fusion with or bridging to other ring systems, and in which the radicals $R_1$ and $R_2$ or $R_1'$ and $R_2'$ optionally contain one or more hetero atoms and are unsubstituted or substituted by a halogen atoms, or a hydroxyl, carboxyl, sulfonic acid, cyano, mercapto, carboxamide, sulfonamide, urethane or keto radical, a primary, secondary or tertiary amino radical or a nitro, ether, $c_1$–$C_{30}$ alkyl, $c_1$–$C_{30}$ alkoxy, aroxy, $C_1$–$C_{30}$ halogenoalkyl, $C_1$–$C_{30}$ halogenoalkoxy or ester radical.

10. A composition as claimed in claim 1, in which:
$R_3$ to $R_{12}$ or $R_3'$ to $R_{12}'$ independently of one another are hydrogen atoms, halogen atoms, straight-chain or branched, saturated or unsaturated $C_1$–$C_{18}$ alkyl or $C_1$–$C_{18}$ alkoxyl radicals, polyoxyalkylene radicals or the formula —($C_1$–$C_5$—alkylene—O)$_{12}$—R, in which R is a hydrogen atom, a $C_1$–$c_4$ alkyl radical or an acryl radical and n is a number from 12 to 10, aryl or heteroaryl a radials or aralkyl, aralkoxy, aroxy, alkaryl or cycloaxlkyl radicals, and two of the radicals $R_3$ to $R_{12}$ or $R_3'$ to $R_{12}'$ are optionally combined to form a saturated or unsaturated, aromatic or non-aromatic 5- to 7-membered ring system, which can contain further hetero atoms and can be substituted and/or modified y fusion with or bridging to other ring systems, and in which the radicals $R_3$ to $R_{12}$ or $R_3'$ to "$R_{12}'$ optionally contain one ore more hetero atoms and are unsubstituted or substituted by a halogen atom, a hydroxyl, carboxyl, sulfonic acide, cyano, mercapto, carboxamide, sulfonamide, urethane or keto radical, a primary, secondary or tertiary amino radicals or a nitro, ether, $C_1$–$C_{30}$ alkyl, $C_1$–$C_{30}$ aloxy, aroxy, $C_1$–$C_{30}$ halogenoalkyl, $c_1$–$C_{30}$ halogenoalkoxy or ester radical.

11. A composition as claimed in claim 1, in which:
$R_{13}$ to $R_{16}$ independently of one another are hydrogen atoms, chlorine atoms, bromine atoms, straight-chain or branched, saturated or unsaturated $C_1$–$C_{30}$ alkyl radicals, polyoxyalkylene radicals of the formula —($C_1$–$C_5$—alkylene—O)$_{12}$—R, in which R is a hydrogen atom, a $C_1$–$C_4$ alkyl radical or an acryl radical and n is a number from 1 to 10, aryl or heteroaryl radicals, aralkyl, aralkoxy, alkaryl, or cycloaxlkyl radicals or carboxyl, sulfonic acid, cyano, carboxamide, sulfonamide, ester, carvoxylate, keto, lactam or ether radicals, and in which the radicals $R_{13}$ to $R_{16}$ optionally contain one or more hetero atoms and are unsubstituted or substituted by a chlorine or bromine atom, a hydroxyl, carboxyl, sulfonic acid, cyano, mercapto, carboxamide or sulfonamide radical, a primary, secondary or tertiary amino radical or a nitro radical.

12. A composition as claimed in claim 1, in which: in the case of shomopolymrization of monomers of the formulae I or II, $R_1$ and $R_2$ and/or $R_1'$ and $R_2'$ are identical of different, and, in the case of copolymerization of mixtures of two monomers of the formulae I to III, both the radicals $R_1$ to $R_1'$ and/or $R_2$ ad $R_2'$ and the anions $X^-$ and $Y^-$ are identical or different.

13. A composition as claimed in claim 1, in which: in said formulae I and II, $X^-$ and $Y^-$ independently of one another are a halide, nitrate, hydroxide, hydrogen sulfate, sulfate, sulfide, sulfite, thiosulfate, bicarbonate, carbonate, dihydrogen phosphate, hydrogen phosphate, phosphate, cyanide, cyanate, isocyanate, thiocyanate, zinc tetracyanate, zine tetrathiocyanate, perchlorate, $BF_4^-$, $PF_6^-$, B(aryl)$_4^-$ $CH_3OSO_3^-$, $C_2H_5OSO_3^-$, phenolate or nitrophenolate anion, a saturated or unsaturated, aliphatic, cycloaliphatic or aromatic carboxylic or sulfonate anion, a perfluorinated saturated or unsaturated, aliphatic, cycloaliphatic or aromatic carboxylic or sulfonate anion, a saturated or unsaturated, aliphatic, cycloaliphatic or aromatic di- or tricarboxylate acid anion or di or trisulfonic acid anion or a tungstate, molybdate or heteropolyacid anion, $X^-$ and $Y^-$ each being optionally present in the form of a mixture of anions.

14. A composition as claimed in claim ,1 in which: in said formulae I to III, the radials $R_1$ and $R_2$ or $R_1'$ and $R_2'$ independently of one another are hydrogen atoms or $C_1$–$C_8$ alkyl, cyclopentyl, cyclohexyl, phenyl, napthyl, pyridyl, benzyl, totlyl or methoxyphenyl radicals, and in which said radicals are unsubstituted or substituted by a halogen atom, a hydroxyl, cyano or mercapto radical, a primary, secondary or tertiary amino radical, or a nitro radical,
and the radicals $R_3$ to $R_{12}$ or $R_3'$ to $R_{12}'$ independently of one another are hydrogen atoms, halogen atoms or $C_1$–$C_8$ alkyl, cyclopentyl, cyclohexyl, phenyl, napthyl, pyridyl, benzyl, tolyl or methoxyphenyl radicals, and in which said radicals are optionally substituted by a halogen atom, a hydroxyl, cyano or mercapto radicals, a primary, secondary or tertiary amino radical or nitro radical, and the radicals $R_{13}$ to $R_{16}$ independently of one another are hydrogen atoms or cyano, $C_1$–$C_8$ alkyl, cyclopentyl, cyclohexyl, phenyl, napthyl, pyridyl, benzyl, tolyl, methoxyphenyl, carocxytl, sulfonic acid, carboxamide, sulfonamide, ester or lactam radicals, and in which said radicals are optionally substituted by a chlorine or nromine atom, a hydroxyl, cyano or mercapto radical, a primary, secondary or tertiary amino radical or nitro radical, and $X^-$ and $Y^-$ independently of one another are an $F^-$, $Cl^-$, $Br^-$, $I^-$, $BF_4^-$, $B(aryl)_4^-$, $PF_6^-$ or $P(Mo_3O_{10})_4^{3-}$ anion, $X^-$ and $Y^-$ each being optionally present in the form of a mixture of anions.

15. A composition as claimed in claim 1, wherein said polymeric ammonium salt charge-control or charge-improving agent is a copolymer obtained by copolymerization of a mixture of two monomers having formulae selected from said formulae I, II, and III, said mixture having a said monomer molar ratio.

16. A composition as claimed in claim 1, wherein said polymeric ammonium salt charge-control or charge-improving agent has a moleculr weight of about 20,000 to about 250,000.

17. A composition as claimed in claim 1, wherein said composition contains about 0.01 to about 30 percent by weight of said charge-control or charge-improving agent.

18. A composition as claimed in claim 1, wherein a said charge-control or charge-improving agent is combined with a second charge-control or charge-improving agent other than a charge-control or charge-improving agent of claim 1.

* * * * *

UNITED STATES PATENT AND TRADEMARK OFFICE
CERTIFICATE OF CORRECTION

PATENT NO.: 5,187,038

DATED: FEBRUARY 16, 1993

INVENTOR(S): Jörg Gitzel, Detlef Wehle and Hans-Tobias Macholdt

It is certified that error appears in the above-identified patent and that said Letters Patent is hereby corrected as shown below:

At column 2, line 27, before "different" insert
--Because of the--.
At column 2, line 48, "said" should read --aid--.
At column 3, line 37 "re" should read --are--.
At column 6, line 40, "caboylic" should read --carboxylic--.
At column 6, line 45, "hyxrogen" should read --hydrogen--.
At column 6, line 59, "acryl" should read --acyl--.
At column 6, line 60, "napthoyl" should read --naphthoyl--.
At column 6, line 62, "natphyl" should read --naphthyl--.
At column 6, line 66, "cycloaxlkyl" should read --cycloalkyl--.
At column 6, line 67, "of" should read --or--.
At column 7, line 33, "acryl" should read --acyl--.
At column 7, line 41, "cycloaxlkyl" should read --cycloalkyl--.
At column 7, line 53, "r12'" should read --$R_{12}'$--.
At column 8, line 9, "acryl" should read --acyl--.
At column 8, line 16, "cycloaxlkyl" should read --cycloalkyl--.
At column 8, line 37, "$R_{15}$" should read --$R_{16}$--.
At column 9, line 30, "cycloaxlkyl" should read --cycloalkyl--.
At column 9, line 44, "$D_4$" should read --$C_4$--.
At column 9, line 55, "cycloaxlkyl" should read --cycloalkyl--.
At Column 10, line 11, "cycloaxlkyl" should read --cycloalkyl--.
At column 13, line 67, "90.95:0.05" should read --0.95:0.05--.

UNITED STATES PATENT AND TRADEMARK OFFICE
CERTIFICATE OF CORRECTION

PATENT NO.: 5,187,038

DATED: FEBRUARY 16, 1993

INVENTOR(S): Jörg Gitzel, Detlef Wehle and Hans-Tobias Macholdt

It is certified that error appears in the above-identified patent and that said Letters Patent is hereby corrected as shown below:

At column 18, line 16, "B.1%" should read --8.1%--.
At column 18, line 22, "diallylnethylocylIammonium" should read --diallylmethyloctylammonium--.
At column 18, line 53, "diallylmethyloclyiammonium" should read --diallylmethyloctylammonium--.
At column 19, line 37, "0:40" should read --60:40--.

In claim 1:

At column 23, line 66, "corna" should read --corona--;
At column 24, line 4, "moleculr" should read --molecular--;
At column 24, line 11, "9.95" should read --0.95--;
At column 24, line 37, "$r_1$'" should read --$R_1$'--;
At column 24, lines 45 and 46, "X and Y" should read --$X^-$ and $Y^-$--; and column 24, line 53, "acide" should be --acid--.

In claim 2:

At column 24, line 64, "prescake" should read --presscake--.

UNITED STATES PATENT AND TRADEMARK OFFICE
CERTIFICATE OF CORRECTION

PATENT NO.: 5,187,038

DATED: FEBRUARY 16, 1993

INVENTOR(S): Jörg Gitzel, Detlef Wehle and Hans-Tobias Macholdt

It is certified that error appears in the above-identified patent and that said Letters Patent is hereby corrected as shown below:

In claim 3:

At column 24, line 67, "eh" should read --the--;
At column 24, last line, "add" should read --and--.

In claim 5:

At column 25, line 8, "coaiec" should read --claimed--.

In claim 6:

At column 25, line 11, "n" should read --in--.

In claim 7:

At column 25, line 16, "int" should read --into--.

In claim 9:

At column 25, line 26, delete the quotation marks preceding $C_5$ in the formula;
At column 25, line 28, "acryl" should read --acyl--;
At column 25, line 30, "cycloaxlkyl" should read --cycloalkyl--;
At column 25, line 40, "atoms" should read --atom--; and
At column 25, lines 43 and 44, "$c_1$" should read --$C_1$--, both occurrences.

UNITED STATES PATENT AND TRADEMARK OFFICE
CERTIFICATE OF CORRECTION

PATENT NO.: 5,187,038

DATED: FEBRUARY 16, 1993

INVENTOR(S): Jörg Gitzel, Detlef Wehle and Hans-Tobias Macholdt

It is certified that error appears in the above-identified patent and that said Letters Patent is hereby corrected as shown below:

At column 25, line 51, "or" should read --of-- and replace "12" by an index --n-- in the formula;
At column 25, line 52, "c4" should read --$C_4$--;

At column 25, line 53, "acryl" should read --acyl--- and "12" should read --1--;
At column 25, line 54, "a radials" should read --radicals--;
At column 25, line 55, "cycloaxlkyl should read --cycloalkyl--;
At column 25, line 60, "y" should read --by--;
At column 25, line 62, delete the quotation marks before "$R_{12}$'";
At column 25, line 63, "ore" should read --or--;
At column 25, line 65, "acide" should read --acid--;
At column 25, last line, "aloxy" should read --alkoxy--; and
At column 26, first line, "$c_1$" should read --$C_1$--.

At column 26, line 8, replace "12" by an index --n-- in the formula;
At column 26, line 10, "acryl" should read --acyl--;
At column 26, line 12, "cycloaxlkyl" should read --cycloalkyl--; and
At column 26, lines 13-14, "car-voxylate" should read --car-boxylate--.

UNITED STATES PATENT AND TRADEMARK OFFICE
CERTIFICATE OF CORRECTION

PATENT NO.: 5,187,038

DATED: FEBRUARY 16, 1993

INVENTOR(S): Jörg Gitzel, Detlef Wehle and Hans-Tobias Macholdt

It is certified that error appears in the above-identified patent and that said Letters Patent is hereby corrected as shown below:

In claim 12:

At column 26, line 23, "shomopolymrization" should read --homopolymerization--.
At column 26, line 25, "of" should read --or--; and
At column 26, line 27, "to" should read --and--.

In claim 13:

At column 26, line 35, "zine" should read --zinc--;
At column 26, lines 38 and 40, "carboxylic" should read --carboxylate--, both occasions;
At column 26, line 42, "tricarboxylate" should read --tricarboxylic--; and
At column 26, line 43, a hyphen should follow the word "di".

In claim 14:

At column 26, line 48, "radials" should read --radicals--;
At column 26, lines 50-51 and 66, "napthyl" should read --naphthyl--, both occasions;
At column 26, line 51, "totlyl" should read --tolyl--;
At column 26, line 62, "radicals" should read --radical--;
At column 26, line 67, "carocxytl" should read --carboxyl--;
At column 27, line 2, "nromine" should read --bromine--.

UNITED STATES PATENT AND TRADEMARK OFFICE
CERTIFICATE OF CORRECTION

PATENT NO.: 5,187,038

DATED: FEBRUARY 16, 1993

INVENTOR(S): Jörg Gitzel, Detlef Wehle and Hans-Tobias Macholdt

It is certified that error appears in the above-identified patent and that said Letters Patent is hereby corrected as shown below:

<u>In claim 16:</u>

At column 28, line 3, "moleculr" should read --molecular--.

Signed and Sealed this

Twenty-second Day of February, 1994

*Attest:*

BRUCE LEHMAN

*Attesting Officer*     *Commissioner of Patents and Trademarks*